C. P. HOLLISTER.
REVERSING GEARING.
APPLICATION FILED NOV. 21, 1910.
1,100,879.
Patented June 23, 1914.
3 SHEETS—SHEET 1.
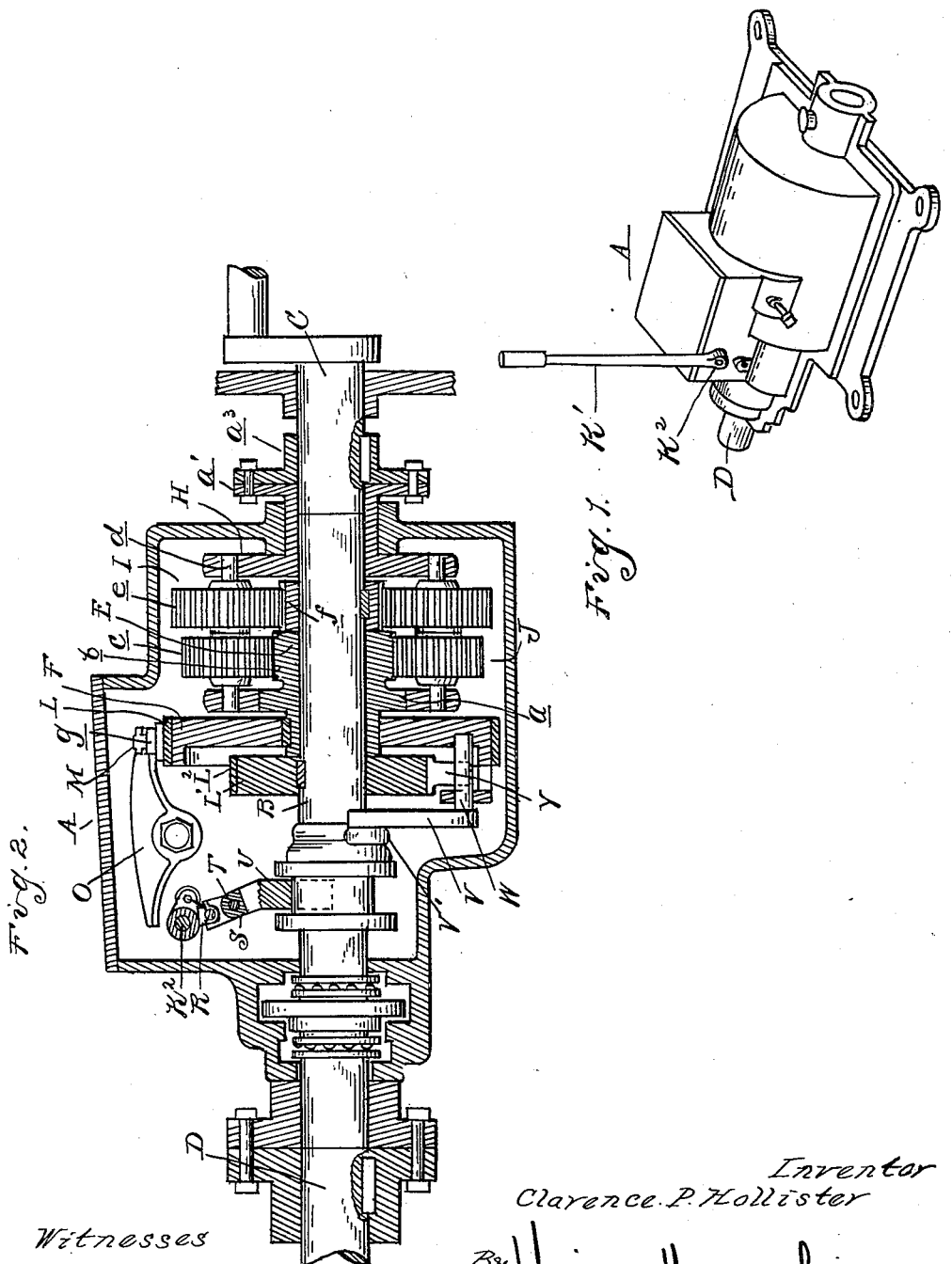

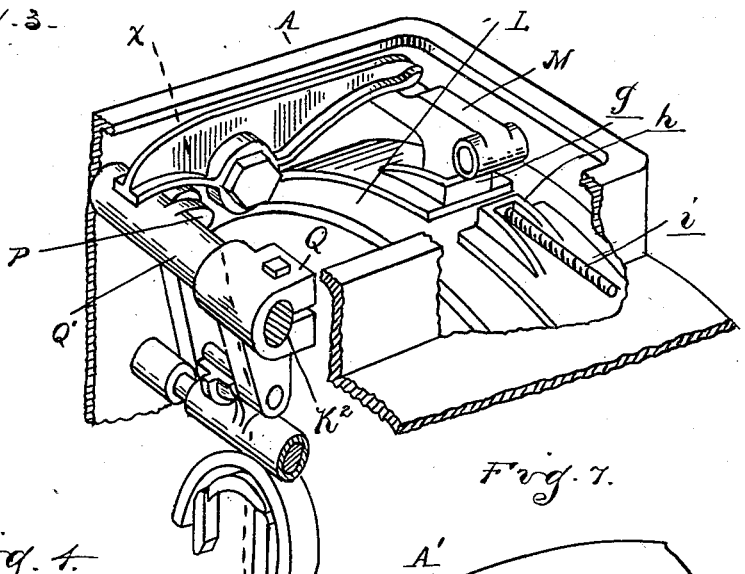
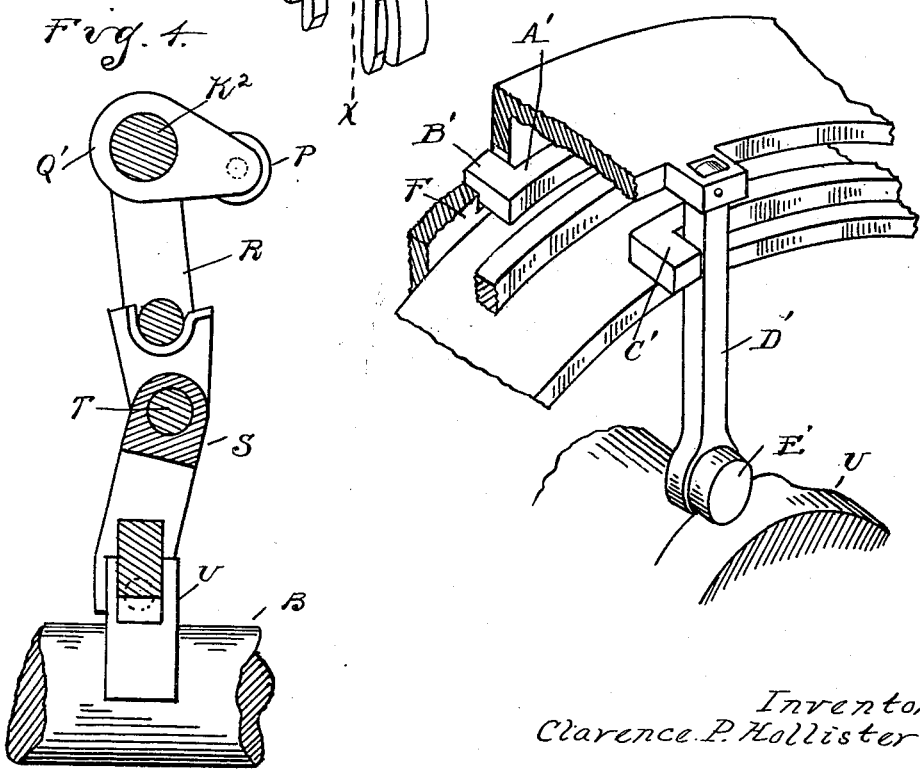

C. P. HOLLISTER.
REVERSING GEARING.
APPLICATION FILED NOV. 21, 1910.
1,100,879.
Patented June 23, 1914.
3 SHEETS—SHEET 3.
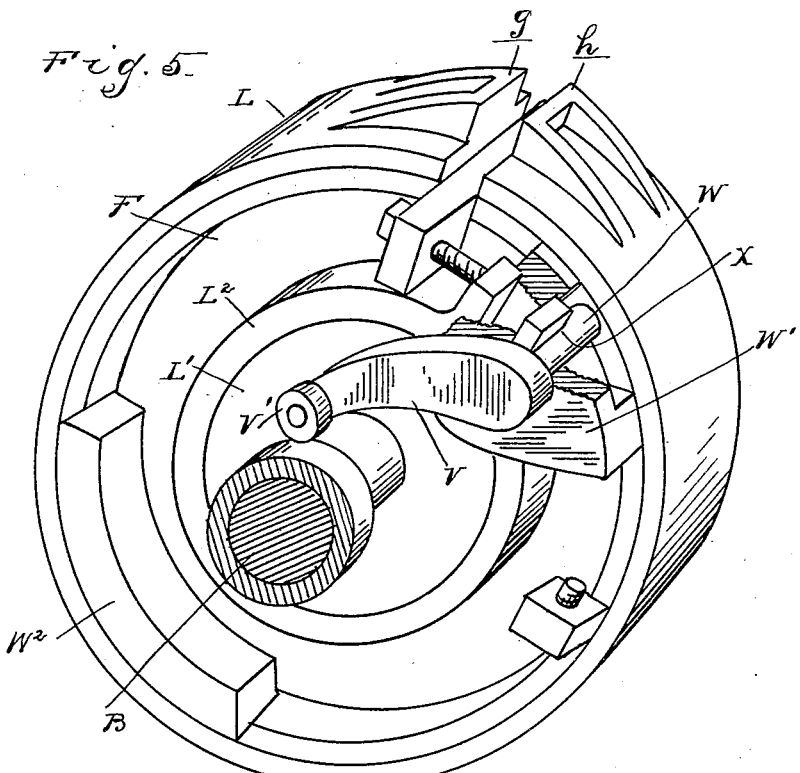
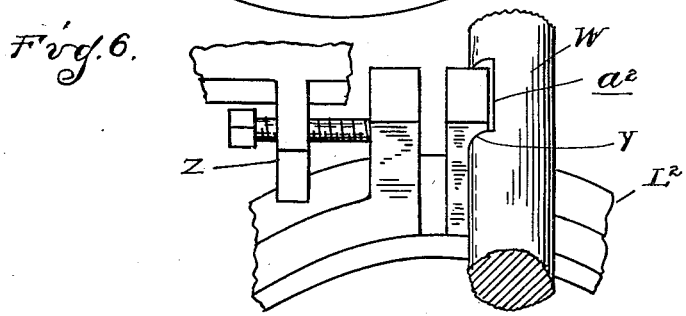
Witnesses
W. K. Ford
James P. Barry
Inventor
Clarence P. Hollister
By Wittemore, Hulbert Wittemore
Atty's

UNITED STATES PATENT OFFICE.

CLARENCE P. HOLLISTER, OF DETROIT, MICHIGAN, ASSIGNOR TO SMITH & BALDRIDGE MACHINE COMPANY, OF DETROIT, MICHIGAN, A CORPORATION OF MICHIGAN.

REVERSING-GEARING.

1,100,879.           Specification of Letters Patent.      Patented June 23, 1914.

Application filed November 21, 1910. Serial No. 593,460.

*To all whom it may concern:*

Be it known that I, CLARENCE P. HOLLISTER, a citizen of the United States of America, residing at Detroit, in the county of Wayne and State of Michigan, have invented certain new and useful Improvements in Reversing-Gearing, of which the following is a specification, reference being had therein to the accompanying drawings.

The invention relates to that type of reversing gearing wherein the driving member, as for instance the engine shaft, rotates in one direction only, and it consists in the novel and simple construction of a reversing gear of this character, in the peculiar arrangement and combination of parts, and in certain details of construction and their arrangements and combinations, as will be more fully hereinafter described and claimed.

In the drawings,—Figure 1 is a perspective view of an embodiment of my invention; Fig. 2 is a vertical central longitudinal section through the mechanism, some of the parts being shown in elevation; Fig. 3 is a sectional perspective view illustrating the control mechanism for the brake and clutch; Fig. 4 is an enlarged sectional view on line $x$—$x$ of Fig. 3; Fig. 5 is an enlarged sectional perspective view, further illustrating the controlling means; Fig. 6 is an enlarged detail view of parts of the clutch-operating means; and Fig. 7 is an enlarged sectional perspective view of a modification.

In the drawings thus briefly described, A represents a suitable inclosing casing mounted upon a power-transmitting shaft B, connected at its ends in a manner hereinafter described to a driving shaft, as for instance a crank shaft of an engine, C, and at its opposite end to a driven shaft D, which may be the propeller shaft of a boat.

Loosely mounted upon the transmitting shaft B is a sleeve E carrying fixed thereto a drum F, and H is a gear cage loosely mounted at one end upon the transmitting shaft and at its opposite end upon a bearing, as $a$, on the sleeve, as plainly shown in Fig. 2. This cage projects beyond the inclosing casing, as shown, and is provided with an annular flange $a'$ adapted to be bolted to a similar flange or coupling member $a^2$ on the crank shaft.

I and J represent step gears positioned within the gear cage and oppositely disposed. Each comprises a train including a pinion $b$ upon the sleeve E, a gear $c$ meshing therewith and fixed upon a stub-shaft $d$, and a similar gear $e$ also fixed upon the said shaft and meshing with a pinion $f$ fixed upon the power-transmitting shaft B.

The drum F is provided on its exterior with a brake band L having abutments $g$ and $h$ upon its extremities, as shown in Fig. 5, the band serving upon actuation of the controlling lever hereinafter described to grip the drum and hold the same stationary, thus producing through the revolution of the gear trains about the transmitting shaft movement of the driven shaft D in a forward direction. A drum L' adjoins the drum F, is fixed to the transmitting shaft by a suitable key, and is provided with a clutch L² in the form of a band, this being likewise actuated by the single operating member previously referred to. When the clutch is applied, the drum L' is locked to the drum F, rotates therewith, and through the gear trains the transmitting shaft B is rotated in the opposite or reverse direction, causing similar movement to be imparted to the driven shaft D.

The control mechanism for the reverse and forward drive is governed by the operating lever K' fixed upon a rock shaft K² journaled in suitable bearings in the inclosing casing A, and in detail is of the following construction:

M represents a bell-crank lever pivoted to the casing and engaging the abutment $g$ upon the brake band L. A set-screw $i$ engages the complementary abutment $h$ on the band, and serves as a means of adjustment for the band to allow of its proper operation.

O is a pivoted lever arm, the end of which extends over and engages the bell-crank M, while the opposite end projects in operative relation to the rock-shaft K². On this rock shaft is fixed, by means of a clamp Q, a sleeve Q' and a cam member or incline P, the latter being adapted upon rotation of the rock shaft to engage the lever O, causing a depression of the bell-crank and the gripping of the drum F by its brake band.

The connection between the rock shaft K² and the drum F through the drum L' comprises a yoke R projecting from the sleeve on the rock shaft, a lever arm S pivoted upon a transverse shaft T for rocking movement and engaging the yoke R, a cam sleeve U mounted for sliding movement upon the transmitting shaft B, the sleeve being in continuous engagement with the lever S, a rock arm V carrying a roller V' engaging the cam sleeve, and a rock shaft W to which the arm V is secured engaging an incline or cam face Y upon one of the extremities of the clutch band L², the opposite end of said band being held by an adjustable abutment Z. The preferred form of engagement between the rock shaft and incline is shown, consisting of a recess $a^2$ formed within the rock shaft immediately opposite the incline, the construction being such that as the rock shaft is rotated the notch will be brought out of engagement with the incline, allowing the shaft periphery to operate the latter to effect the clamping or clutching engagement desired.

The shaft W is supported in a bearing section W' upon the drum F, and a weight W² is provided on the opposite side of the drum to counterbalance it.

In practice, the parts being arranged and constructed as set forth, where it is desired to secure forward movement of the driven shaft from the driving member revolving continuously in one direction, the controlling lever is shifted in a direction to cause the engagement of the brake band L with the drum F, the drum being thus held stationary, as before pointed out. For obtaining the reverse movement, the lever is thrown in the opposite direction, causing the operation of the clutch and the consequent locking together of the drums with the resultant movement of the loose drum in unison with the transmitting shaft. Movement of the controlling lever into a neutral position, as indicated in Fig. 1, permits the engine or driving shaft to rotate without imparting motion to the driven member.

In Fig. 7 I have shown a modified form of clutch, consisting primarily of a spirally wrapped band, as A'. One end, B', of the spiral is anchored in the drum F, while upon the opposite end—preferably opposite the point of anchorage—is a lateral extension C' adapted to be engaged by a lever arm D' pivoted to the periphery of the drum F and carrying at its lower end a roller E' in operative relation to the cam sleeve U.

What I claim as my invention is,—

1. In reversing gearing, the combination with a power-transmitting shaft, of complementary drums respectively fixed and loose thereon, gearing between one of said drums and said shaft, a single operating lever, and mechanism controlled by the lever acting on the shifting of the latter in opposite directions to respectively hold the loose drum against movement and lock the drums to rotate in unison.

2. In reversing gearing, the combination with a power transmitting shaft, of a drum loosely mounted thereon, a gear train between said shaft and drum, a brake band encircling the drum, a bell-crank lever for applying the band, a lever arm disposed transversely in relation to the bell-crank and engaging one of its arms, a rock shaft, a member thereon for operating the lever arm, and a control lever for actuating the shaft.

3. In reversing gearing, the combination with a power-transmitting shaft, of a fixed and a loose drum thereon, coöperating gear trains between one of said drums and said shaft, a band brake for the loose drum, and a clutch for the fixed drum carried by said loose drum, a rock shaft, and a single operating member therefor, and an operating connection between said shaft and the brake and clutch.

4. In reversing gearing, the combination with a power-transmitting shaft, of complementary drums respectively fixed and loose thereon, a gear train upon one of said drums and connecting said shaft, a band brake for the loose drum, and a clutch for the fixed drum, a single control lever having an operative connection with the band, a cam sleeve upon the transmitting shaft, a lever mechanism fulcrumed upon the loose drum and operatively associated with the brake band and a cam sleeve, and an operative connection between said sleeve and the control lever.

5. In reversing gearing, the combination with a power-transmitting shaft, complementary drums fixed and loose thereon, gearing on one of said drums and said shaft, a brake for the loose drum and a clutch for the fixed drum, a rock shaft and an operating lever therefor, a connection between said shaft and the brake, an arm upon the rock shaft, a cam sleeve upon the transmitting shaft, a lever fulcrumed for engagement with said sleeve and the rock shaft arm, and an operative connection between the cam sleeve and the brake band.

6. In reversing gearing, the combination with a power transmitting shaft of complementary drums respectively fixed and loose thereon, a gear train between one of said drums and said shaft, a clutch for the fixed drum carried by the loose drum, a brake for the latter drum, and a single control member for alternately applying the brake and clutch.

7. In reversing gearing, the combination with a power transmitting shaft of complementary drums fixed and loose thereon, coöperating gears on said shaft and one of said drums, a brake for the loose drum and a clutch for the fixed drum, a rock shaft and coöperating lever therefor, a connection between said shaft and brake, an arm upon the rock shaft, a cam sleeve upon the transmitting shaft, a lever fulcrumed for engagement with said sleeve and the rock arm, and an operative connection between the cam sleeve and brake band.

In testimony whereof I affix my signature in presence of two witnesses.

CLARENCE P. HOLLISTER.

Witnesses:
JAMES P. BARRY,
AUBREY PULLEYBLANK.

Copies of this patent may be obtained for five cents each, by addressing the "Commissioner of Patents, Washington, D. C."